United States Patent
Zaiss

(10) Patent No.: US 9,611,829 B1
(45) Date of Patent: Apr. 4, 2017

(54) FLOWING WATER ENERGY CONVERSION SYSTEM

(71) Applicant: Zachary R. Zaiss, Fair Oaks, CA (US)

(72) Inventor: Zachary R. Zaiss, Fair Oaks, CA (US)

(*) Notice: Subject to any disclaimer, the term of this patent is extended or adjusted under 35 U.S.C. 154(b) by 644 days.

(21) Appl. No.: 14/076,565

(22) Filed: Nov. 11, 2013

Related U.S. Application Data

(60) Provisional application No. 61/725,641, filed on Nov. 13, 2012.

(51) Int. Cl.
*F03B 9/00* (2006.01)
*F03B 3/00* (2006.01)

(52) U.S. Cl.
CPC .................. *F03B 9/00* (2013.01); *F03B 3/00* (2013.01); *F03B 9/005* (2013.01)

(58) Field of Classification Search
CPC .... F03B 3/00; F03B 7/00; F03B 7/006; F03B 7/003; F03B 9/00; F03B 9/005; F03B 13/14; F03B 13/16; F03B 13/18; F03B 13/1825; F03B 13/1835; F03B 13/22; F03B 13/264; F03B 17/062; F03B 17/064; F03B 17/066; F03B 17/068
USPC ........................................ 416/8, 17; 415/5, 6
See application file for complete search history.

(56) References Cited

U.S. PATENT DOCUMENTS

| | | | | |
|---|---|---|---|---|
| 4,859,146 A | * | 8/1989 | Labrador | .................. F03D 5/04 415/5 |
| 2011/0062715 A1 | * | 3/2011 | Dimaggio | ............. F03B 17/066 290/54 |
| 2012/0051910 A1 | * | 3/2012 | Kim | ...................... F03B 17/066 416/8 |

* cited by examiner

*Primary Examiner* — Craig Kim
*Assistant Examiner* — Juan G Flores
(74) *Attorney, Agent, or Firm* — Heisler & Associates

(57) ABSTRACT

The system includes a support structure with upstream and downstream pulleys rotatably supported thereby and with cables following circuits around each of the upstream and downstream pulleys. Prime movers, such as in the form of sail members, are attached to the cable. These prime movers have surfaces which are more perpendicular to the flowing water when on a downstream leg of the cable circuit than when on an upstream leg thereof. The prime movers are configured to rotate as they pass about the downstream pulley and upstream pulley to optimize their orientation to minimize drag when following the upstream leg of the circuit and to maximize surface area against which the flowing water acts when following the downstream leg of the cable circuit. Power is outputted from the system through action of the cable upon a power output such as an electric generator coupled to one of the pulleys.

12 Claims, 4 Drawing Sheets

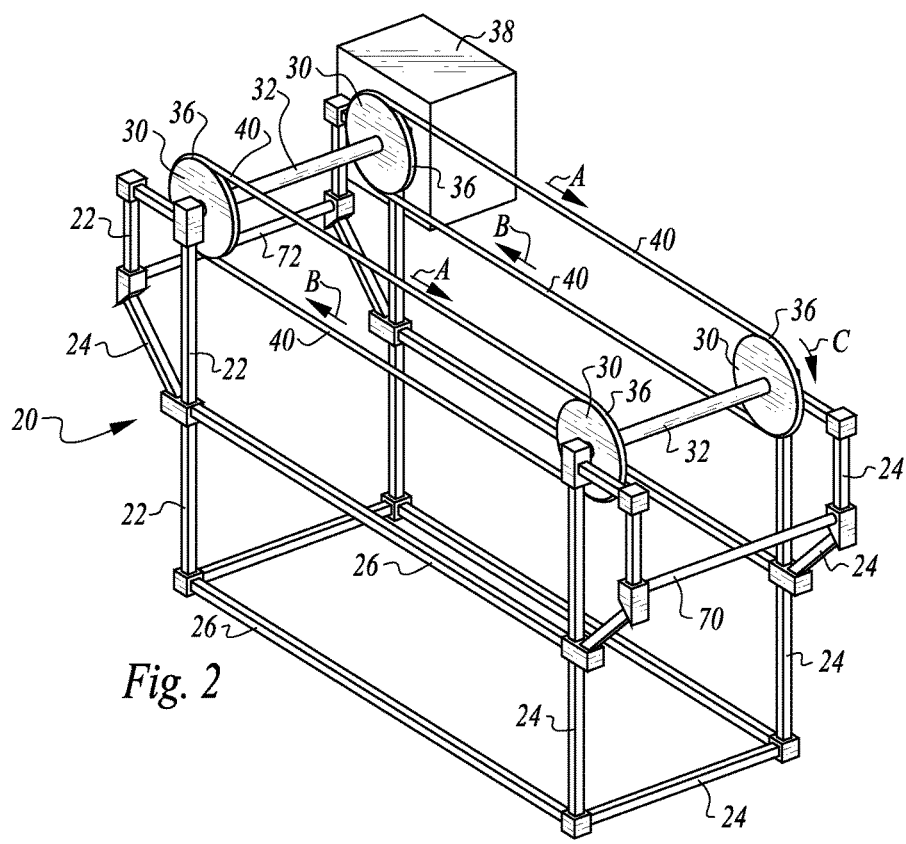
Fig. 2
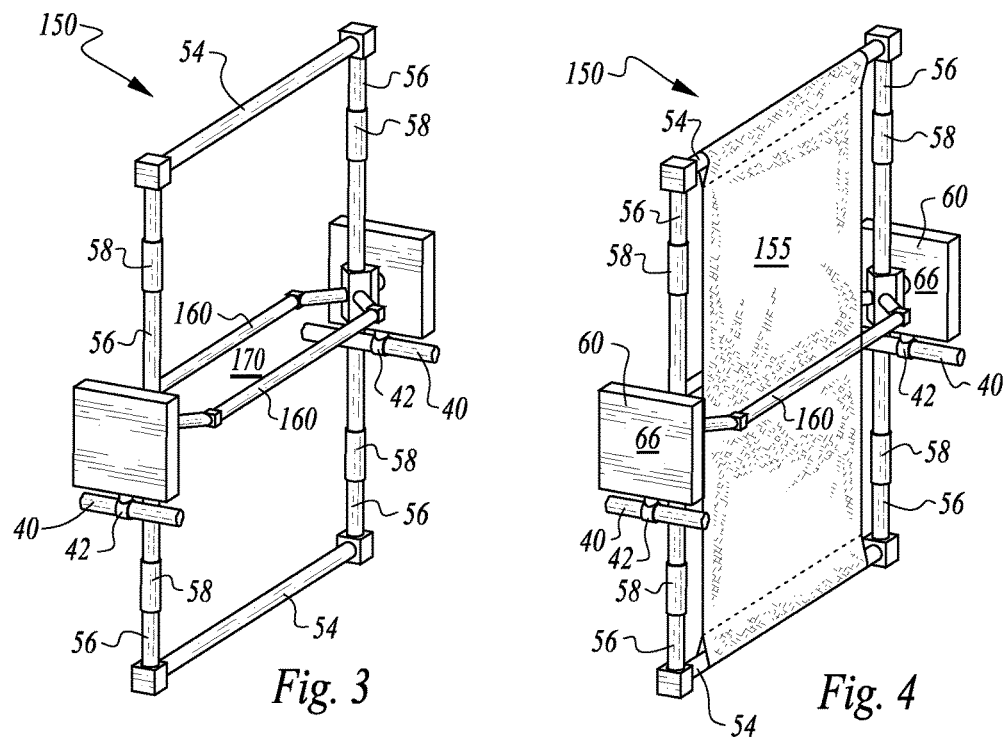
Fig. 3
Fig. 4

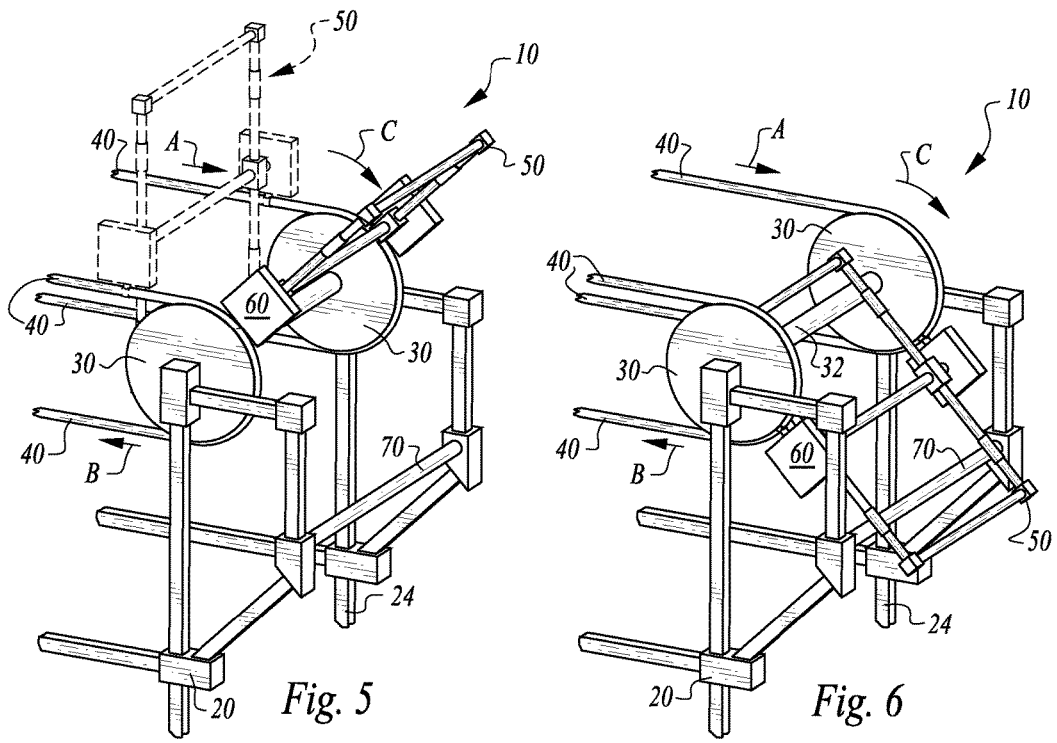
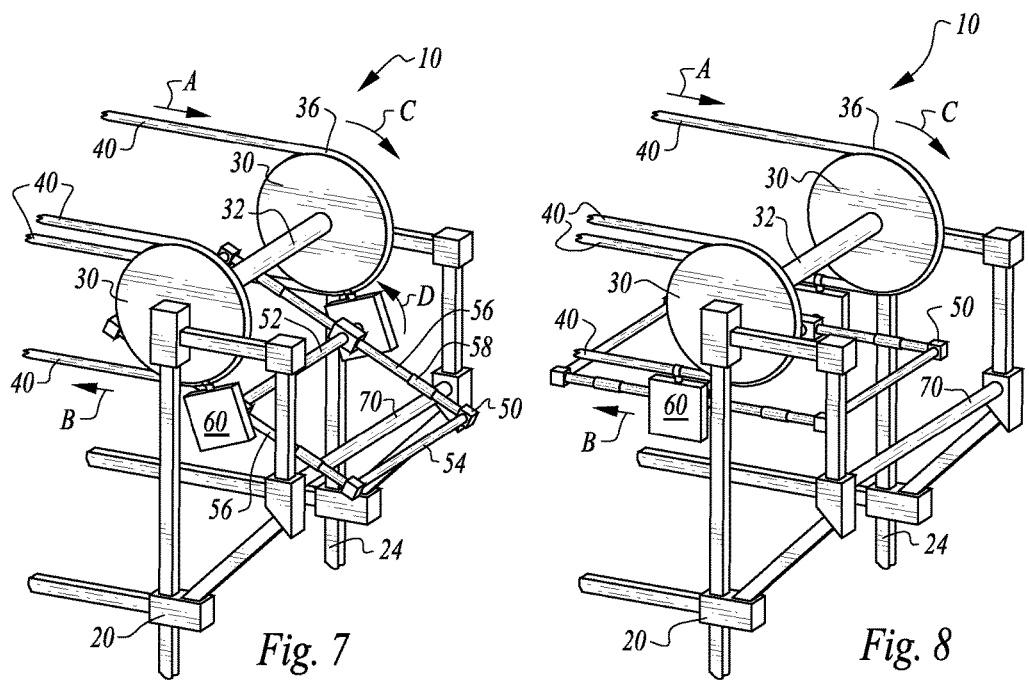

FLOWING WATER ENERGY CONVERSION SYSTEM

CROSS-REFERENCE TO RELATED APPLICATIONS

This application claims benefit under Title 35, United States Code §119(e) of U.S. Provisional Application No. 61/725,641 filed on Nov. 13, 2012.

FIELD OF THE INVENTION

The following invention relates to hydrodynamic power generation systems which turn moving water into useful energy output. More particularly, this invention relates to horizontally moving water based energy harvesting systems which include prime movers upon which flowing water acts and which are on a cable circuit which drives an electric generator or similar power output.

BACKGROUND OF THE INVENTION

Meeting the energy needs of the world's population is an ongoing challenge. Currently, a majority of the world's energy needs are met by combustion of various fuels in stationary power plants or mobile engines onboard vehicles. Problems associated with relying heavily upon combustion based power production include the potential depletion of fuel resources over time, and the air and other environmental pollution associated with combustion of these fuels.

"Renewable" energy sources provide an alternative source of energy which avoids at least some of the negative consequences of traditional combustion based power production. At present, such renewable power generation systems have been limited in the amount of energy that they can reliably provide to meet the overall power needs of the world's population. For instance, the electricity grid in most countries is fed with power from renewable power generation sources which typically accounts for less than one-fourth of all of the power fed to the electricity grid. Furthermore, some sources of renewable power do not provide power on a reliable or continuous basis. For instance, solar power is only available during the day and when the sky is relatively free of clouds. Wind energy is only available when the wind is blowing. Accordingly, a need exists for greater quantities of renewable energy and for sources of renewable energy which reliably provide power on a continuous or near-continuous basis.

One potential reliable source for renewable energy is to capture energy from ocean waves or waves in other large bodies of water. Waves are formed by action of wind upon a surface of the water. The water has sufficient mass that once the wind has created the waves, the waves will continue to move even when the wind ceases or changes direction. As a result, most areas on the world have a significant quantity of wave energy available for harvest on a substantially continuous basis. Wave energy is a source of practically unlimited energy which involves no negative atmospheric emissions, making it a prime candidate for addition of large quantities of renewable energy to the electric power grid.

Wave energy harvesting systems can operate generally vertically or horizontally. With vertical systems a prime mover usually floats on the water and moves up and down as waves pass. With horizontal systems a prime mover is carried along horizontally by action of horizontally moving water. Horizontal systems benefit from also being used to harvest tidal flow energy, river flow energy or ocean current energy in addition to wave energy.

Wave energy can be difficult to effectively harness. Accordingly, a need exists for an effective power plant for harvesting wave energy and converting it into electric power suitable for feeding to an electric power grid or for use to provide power to local off grid electric power systems.

SUMMARY OF THE INVENTION

With this invention a power plant is provided which converts wave energy into electric energy. The power plant is supported by an overall support structure generally depicted by lower rigid elements within the system. This structure could be affixed to a sea (or river) floor and have an overall height slightly less than a typical depth of the water. However, preferably this structure is moored to the ocean floor but has ballast tanks strategically located on the structure so that the structure is suspended just below the surface with upper portions of the structure sufficiently below the surface so that "sails" rotating upon the wheels of the power plant remain just below, or perhaps slightly above the surface. In one embodiment, these ballast tanks also float on the surface and can include navigation beacons or other equipment to keep shipping traffic and other vessels from colliding with the power plant. While the structure is shown as a single structure, it is conceivable that two separate structures could be provided one for an upstream end and one for a downstream end of the overall power plant, provided that they can be reliably kept apart by a distance which is approximately constant so that tension can be maintained on cables of the power plant.

The structure not only supports the moving portions of the power plant which capture the wave energy, but also supports one or more electric generators which convert rotating mechanical energy into electric energy (or other power output, such as shaft power to operate any power utilizing system), and power lines which would run from the structure to an adjacent interconnection location where the electric power can be fed to the electricity grid or otherwise into an electric power utilization system. Such power cables can also provide a conduit along which sensor signals can run so that performance of the overall power plant can be effectively monitored and/or controlled.

To accommodate tides, and to otherwise optimize the overall power plant at the proper position for maximum power generation, the mooring lines which couple the structure to the sea floor can potentially be of adjustable length, such as upon some form of winch. As another alternative, the mooring lines can be sufficiently long to accommodate a maximum height of the structure above the sea floor, and the overall structure can merely move laterally on its mooring lines to accommodate positioning of the structure at the optimal location near the surface with the mooring lines merely going from substantially vertical to more diagonal in orientation. While the mooring lines are typically cables, they could be rigid elements which pivot between the structure and an underlying ocean floor foundation.

In an exemplary embodiment, the power plant includes four pulley wheels and two cables. The four wheels are positioned with two of the wheels coaxial to each other and located in an "upstream" position and two of the wheels coaxial with each other and located in a "downstream" position. The terms "upstream" and "downstream" are used to represent position of the structure relative to the direction that the waves are advancing (or water is otherwise moving). In the ocean, the portion of the structure closest to the shore or away from the direction of wave approach would be the "downstream" position. The portion of the structure furthest from the shore or closer to the direction of wave approach would be the "upstream" position. Wave energy advancing toward the shore would thus be captured. If the power plant were mounted within a river, the upstream direction would be the direction from which the water in the river is coming and the downstream direction would be the direction in which the water is flowing.

These pairs of coaxial wheels preferably have a common shaft upon which they are mounted. Each of the wheels is also oriented in a plane substantially coplanar with one of the wheels mounted to the other shaft. These pairs of coplanar wheels each have one of the two cables coupled thereto. The cables are tight upon the wheels so that the wheels rotate together and the cable is caused to follow a circuit passing over each of the two wheels. The cables are preferably kept substantially taught. The wheels preferably have a groove on a rim thereof which matches a contour of the cables, so that the grooves in the wheels keep the cables securely mounted upon the wheels. Thus, only circuit-following movement of the cables along with rotation of the wheels is accommodated.

The cables preferably have at least four sails mounted thereto in the exemplary embodiment, with sails extending between the two cables, typically extending perpendicular to the cables. These cables are each oriented within planes which are preferably substantially parallel to each other and the sails pass between these two parallel planes with ends of the sails mounted to each of the cables. By placing the sails an equal distance from each other along the cables, at least one of the sails is always deployed and being pushed along by the waves so that the power generation system maintains operation.

The sails provide a preferred form of prime mover to collect the energy in the waves or other moving water, and in the exemplary embodiment are preferably generally rectangular in form and are held in a substantially taut orientation by a rectangular frame surrounding a perimeter of the sails. The sails can be attached to each of the four perimeter sides of the frame or can merely be attached to at least portions of the frame and suspended therebetween.

Preferably, the frame also includes a forward and rearward catch bar. These catch bars assist in keeping the sail fabric from stretching excessively, such as when particularly strong or fast waves are being encountered. The frames of each sail are maintained in an orientation within a plane perpendicular to the planes in which the cables are oriented, when the sails are moving downstream and collecting energy.

Furthermore, the sails have two general orientations which are selected through a rotating mechanism (also referred to as a "sail orientation controller") at at least one junction of each sail and the cables. The rotating mechanism in the exemplary embodiment is in a form generally akin to that of a four point turnstile which allows the sail to rotate 90° relative to the rotating mechanism when the frame of the sail impacts a blocking bar adjacent each downstream pair of wheels and adjacent each upstream pair of wheels. The blocking bars are strategically positioned so that when the sails are moving downstream on an upper run of the cables, the sail frames are in a substantially vertically plane. When these sails abut the blocking bar, they are caused to rotate through the rotating mechanism 90°. The cables also go through a 180° turn, leaving the sails oriented substantially horizontally as they move in an upstream direction on a lower run of the cables (see FIG. 6).

When these collapsed sails reach the upstream wheels, they again abut a second blocking bar which causes the sails to rotate another 90°. When these sails pass around the upstream wheels and the cable rotates them 180°, this leaves the sails deployed and in a substantially vertical orientation as they pass along an upper route of the cables between the upstream wheels and toward the downstream wheels.

With this configuration, the sails are deployed when moving in a downstream direction and are collapsed when moving in an upstream direction. Hence, even if the wave energy is moving vigorously at great depths, the sails are in a streamlined orientation with little resistance when moving upstream and in a deployed configuration which catches the waves when moving in a downstream direction.

While four sails are shown in a simple embodiment depicted in the figures, a greater number of sails could be provided by either enlarging a length of the structure or by decreasing a size of the sails, or by allowing the sails to be closer together, provided that they do not abut each other. Also, fewer than four sails, and as few as one sail could be provided. With a smaller number of sails it is important that the system have sufficient inertia to keep moving when none (or too few) of the sails is deployed to harvest energy. For instance, the pulley wheels could be fitted with added mass adjacent rims thereof to increase rotational inertia and keep the cables moving at all times.

At least one of the wheels has an electric generator coupled thereto. One location for such a generator would be mounted to the shaft upon which the upstream wheels are mounted. This shaft is caused to rotate by action of the waves upon the deployed sails on an upper run of the cables, causing the wheels to move in a clockwise direction. The generator converts this rotating shaft energy into electric energy utilizing known techniques. The wheels themselves can be provided with sufficient mass so that they act somewhat like fly wheels to help balance out the amount of power available for the generator with a minimum of spikes in energy and spikes in velocity and power provided by the overall power plant.

A diameter of the wheels is selected so that an upper run of the cables and a lower run of the cables are sufficiently far apart so that the deployed sails do not abut the collapsed sails as they pass each other on the upper and lower runs of the cables. While the embodiment shown is a simple route for the cables with the upper run parallel to the lower run and with a spacing therebetween matching a diameter of the wheels, it is conceivable that the cables could have a more complex route. For instance, additional idler wheels could be provided at a lower elevation, such as affixed to lower portions of the support structure, and the cables could be routed from their upper run between the wheels and then in a downward, and then upstream, and then upward orientation, so that greater spacing is provided between an upper run of the cables and a lower run of the cables and to potentially accommodate larger sails. With such a routing, the blocking bars would be adjacent the lower upstream and lower downstream wheels.

The rotating mechanism preferably has a resistance to rotation of the sail frame relative to the cable which is carefully selected. This resistance to rotation is sufficiently high so that variations in wave energy acting upon the sails is not sufficient to cause the sails to rotate prematurely. However, when the frame of a sail abuts the blocking bar, the threshold force required to allow the rotating mechanism to facilitate 90° of rotation is achieved without requiring significant exertion of energy between the sails and the blocking bar.

Points of actual abutment of the frames with the blocking bar can be fitted with bumpers formed of a material selected to avoid damage when these forces are encountered and to transmit this sufficient peak force to the rotating mechanism, so that the rotating mechanism allows the 90° of rotation for the sail. This mechanism can require a peak threshold amount of force to begin this rotation but then a much lower amount of force to complete the 90° of rotation and then again a high degree of resistance to rotation past 90° so that the sail reliably always rotates substantially 90° for maximum streamlined orientation when the sails are moving in an upstream direction.

As one potential modification to this invention, the rotating mechanism can have a locking element which locks the sail in the deployed orientation based on the position of the sail. When the sail comes into close proximity to the locking bar, a sensor can detect this proximity, such as by a magnetic sensor coming into close proximity to a magnet located on or adjacent the blocking bar, which unlocks this locking mechanism just before the sail abuts the blocking bar. The sail is thus unlocked and ready for rotation just before it abuts the blocking bar and then a relatively small amount of force is required to be applied by the blocking bar to rotate the sail. The rotating mechanism also preferably has a "free wheel" type sub-mechanism thereon which prevents the sail from ever rotating in a reverse direction, to further maintain the sail in the desired orientation in a reliable manner.

OBJECTS OF THE INVENTION

Accordingly, a primary object of the present invention is to provide a system for converting flowing water energy, such as horizontally moving waves, tidal flows, river flows or current flows into useful power output.

Another object of the present invention is to provide a wave or other flowing water energy conversion system of simple and reliable operation.

Another object of the present invention is to provide a method for converting the energy associated with flowing water into useful energy.

Another object of the present invention is to provide a method for extracting power from energy associated with flowing water such as horizontally moving waves, tidal flow, river current, ocean current or other sources of flowing water.

Another object of the present invention is to provide a flowing water energy converter which can be easily deployed, operated and maintained in a safe and reliable manner.

Another object of the present invention is to provide a moving water energy conversion system which converts the energy associated with moving water into electric power.

Another object of the present invention is to provide a moving water energy conversion system which can be adapted to use in a variety of different bodies of water with different water flow rates and other site specific details.

Other further objects of the present invention will become apparent from a careful reading of the included drawing figures, the claims and detailed description of the invention.

BRIEF DESCRIPTION OF THE DRAWINGS

FIG. 2 is a perspective view of that which is shown in FIG. 1 with sail portions of the invention removed.

FIG. 3 is a perspective view of an alternate sail assembly of this invention shown without a sail member.

FIG. 4 is a perspective view similar to FIG. 3, but including a sail member mounted thereon.

FIGS. 5-8 are detailed perspective views of a portion of that which is shown in FIG. 1 at a downstream end thereof and illustrating how the sail assemblies move about the downstream end of the system and how the sail assembly rotates from a deployed orientation to a collapsed streamlined orientation for return in an upstream direction

DESCRIPTION OF THE PREFERRED EMBODIMENT

Figure 9:
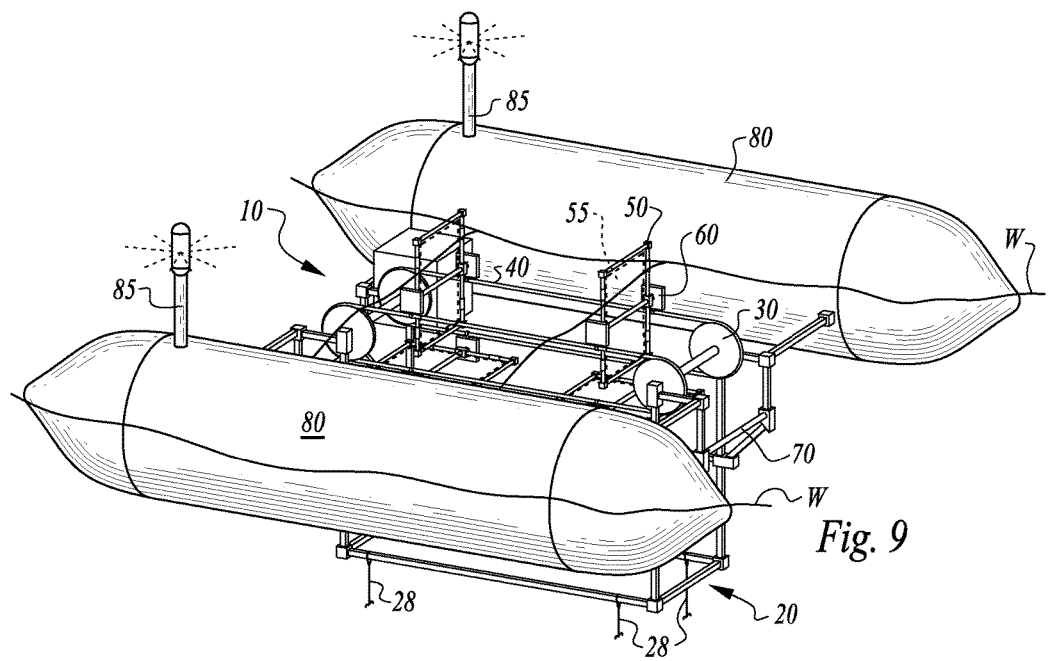
FIG. 9 is a perspective view of the wave energy conversion system of this exemplary embodiment and further including ballast tanks which can act as floats to position the system at a proper elevation and orientation.

Referring to the drawings, wherein like reference numerals represent like parts throughout the various drawing figures, reference numeral 10 is directed to a wave energy conversion system which provides an exemplary embodiment of the flowing water energy conversion system of this invention. The system 10 is typically configured to be oriented near a surface of water W (FIG. 9) with one end upstream and the other end downstream so that advancing horizontal waves or other sources of moving water W can be captured by the system to generate power.

Figure 1:
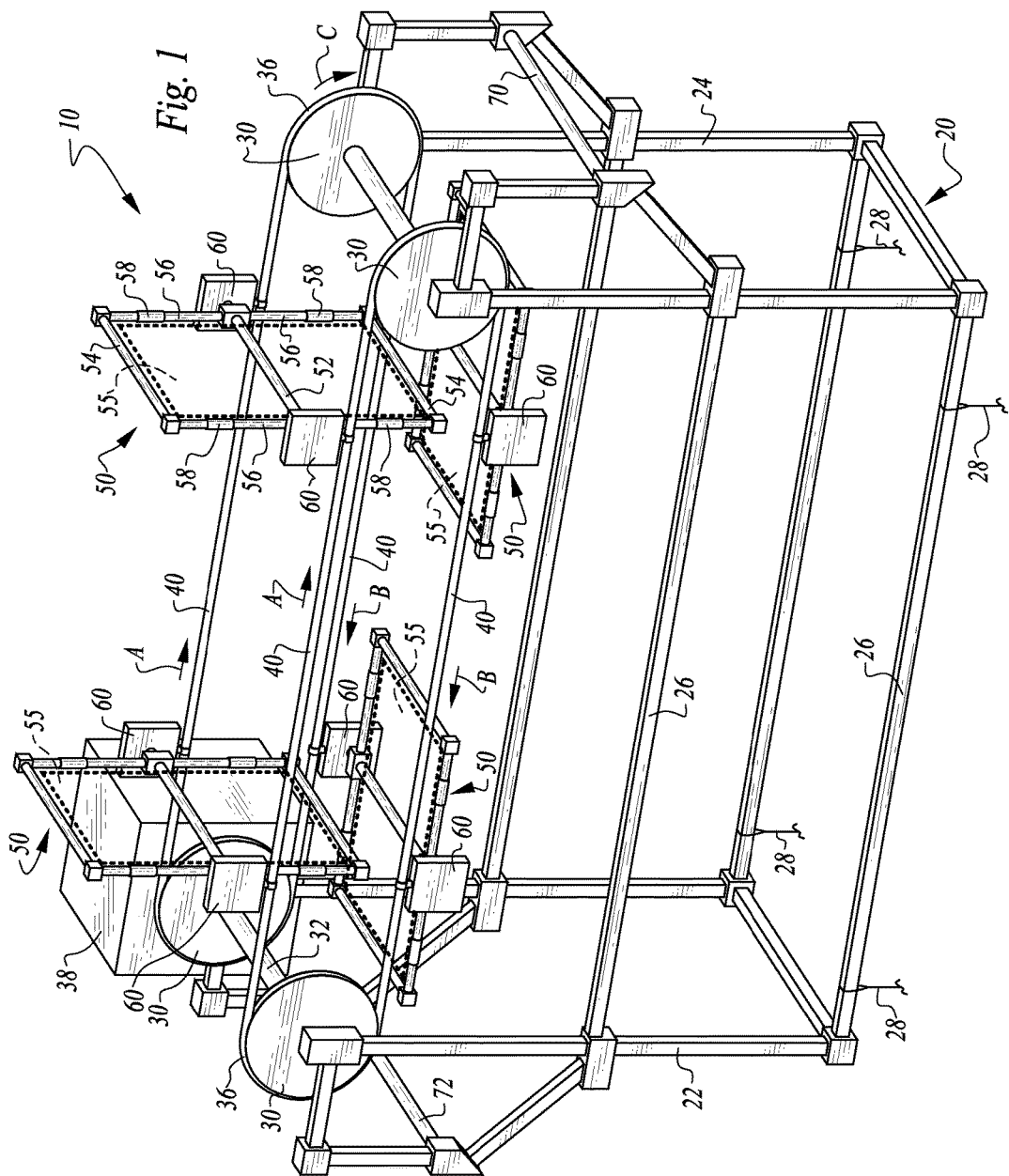
FIG. 1 is a perspective view of a wave energy conversion system of this invention according to an exemplary embodiment, shown in operation but without the water that causes the system to operate.

In essence, and with particular reference to FIG. 1, basic details of the system 10 are described, according to this exemplary embodiment. The wave energy conversion system 10 includes a support structure 20 formed of separate rigid elements. The support structure 20 can be mounted to the ocean floor or other ground beneath a body of water or could be moored to ground by flexible or pivoting elements. The support structure 20 rotatably supports a plurality of pulleys 30, typically including two upstream pulleys 30 and two downstream pulleys 30. Two cables 40 are routed over pairs of pulleys 30. The cables 40 form a circuit including a downstream run extending between each pair of coplanar upstream and downstream pulleys 30 and an upstream run extending between the pair of pulleys 30. A plurality of sail assemblies 50 act as prime movers coupled to the cables 40.

The sail assemblies 50 have a deployed configuration and a collapsed configuration with the sail assemblies 50 having the deployed configuration when passing along the downstream run of the cable 40 and in the collapsed position when traveling along the upstream run of the cable 40. In this way, the sail assemblies 50 are configured to be carried along by waves or other moving water W (FIG. 9) when passing along the downstream run (arrow A) of the cable 40, but are collapsed and provide low resistance when moving along the upstream run (arrow B) of the cables 40. The sail assemblies 50 are mounted to the cables 40 through sail orientation controllers 60. These controllers 60 allow the sail assemblies 50 to rotate relative to the cables 40 so that the sail assemblies 50 have the deployed orientation when passing along the downstream run and have the collapsed orientation when passing along the upstream run.

A blocking bar 70 can be utilized adjacent the downstream pulleys 30, and optionally also adjacent the upstream pulleys 30, so that the sail assemblies 50 are caused to be rotated from the deployed orientation to the collapsed orientation as they pass around the downstream pulleys 30 and to be rotated back to the deployed orientation when passing around the upstream pulleys 30. Ballast tanks 80 (FIG. 9) are optionally provided to control elevation of the entire system 10 relative to a surface of water W and also to cause the system 10 to be oriented generally aligned with a direction of oncoming waves or other water W current.

More specifically, and with particular reference to FIGS. 1 and 2, details of the support structure 20 of the system 10 are described, according to this exemplary embodiment. The support structure 20 includes a series of separate rigid elements joined together to form the overall support structure 20 so that the pulleys 30 and cables 40 are positioned where desired for routing of the sail assemblies 50 and operation of the wave energy conversion system 10. In particular, the support structure 20 includes fore elements 22 located on an upstream side of the support structure 20 and aft elements 24 located at a downstream end of the support structure 20. Lateral elements 26 are preferably provided which extend generally horizontally and join the fore elements 22 to the aft elements 24 and maintain spacing between the fore elements 22 and the aft elements 24.

As an alternative, the fore elements 22 and the aft elements 24 could be unconnected and merely affixed to the ground at a desired spacing therebetween or could conceivably be moored with sufficient spacing therebetween that the mooring lines 28 keep tension between the fore elements 22 and the aft elements 24. Most preferably, the support structure 20 is connected to an ocean bottom (or other floor of a body of water) through mooring lines 28 extending down from the support structure 20.

The support structure 20 can have buoyancy such as by having air contained within hollow tubular elements making up the support structure 20 and/or could include the ballast tanks 80 (FIG. 9) which can be adjusted in the amount of air and water therein so that the entire support structure 20 can be controlled as to its height to position the sail assemblies 50 where desired for optimum energy harvesting, and also to allow for bringing of much of the system 10 out of the water, such as for maintenance. Navigation lights 85 (FIG. 9) are preferably provided on the ballast tanks 80 to allow shipping traffic to avoid the system 10. By making the ballast tanks 80 elongate and parallel with the downstream run of the cables, the ballast tanks will tend to rotate to always be aligned with the oncoming waves, so that the system 10 is at least somewhat self-orienting. The support structure 20 illustrated in FIGS. 1 and 2 is merely one exemplary configuration for the support structure 20, and a variety of different configurations of elements could be provided so that the pulleys 30 are rotatably supported generally as shown and with tension on the cables 40 routed between the pulleys 30.

With continuing reference to FIGS. 1 and 2, specific details of the pulleys 30 and cables 40 are described, according to this exemplary embodiment. The pulleys 30 are in the form of wheels and include a pair of upstream pulleys 30 rotatably mounted to the support structure 20 and preferably on a common shaft 32 which is rotatably supported by the fore elements 22 of the support structure 20. The pulleys 30 include a similar pair of downstream pulleys similarly mounted to the support structure 20 and preferably on a common shaft 32, which is rotatably supported by the aft elements 24 of the support structure 20.

Each pulley wheel 30 has a rim 36 which is preferably grooved with a diameter similar to that of the cable 40 so that the cable 40 can reside within this groove at the rim 36 of the upstream pulleys 30 and the downstream pulleys 40 so that the cable 40 is held within its circuit routed over the pulleys 30. A generator 38 is preferably coupled to the shaft 32 of one of the sets of pulleys 30. For instance, the generator 38 can be configured in a direct drive configuration to the upstream shaft 32 associated with the upstream pulleys 30. Conceivably, multiple generators 38 could be provided such as at opposite ends of the upstream shaft 32 and/or at opposite ends of a downstream shaft 32 joining two downstream pulleys 30. If there are no shafts, the generator 38 can be coupled to one or more of the pulleys 30.

Figure 10:
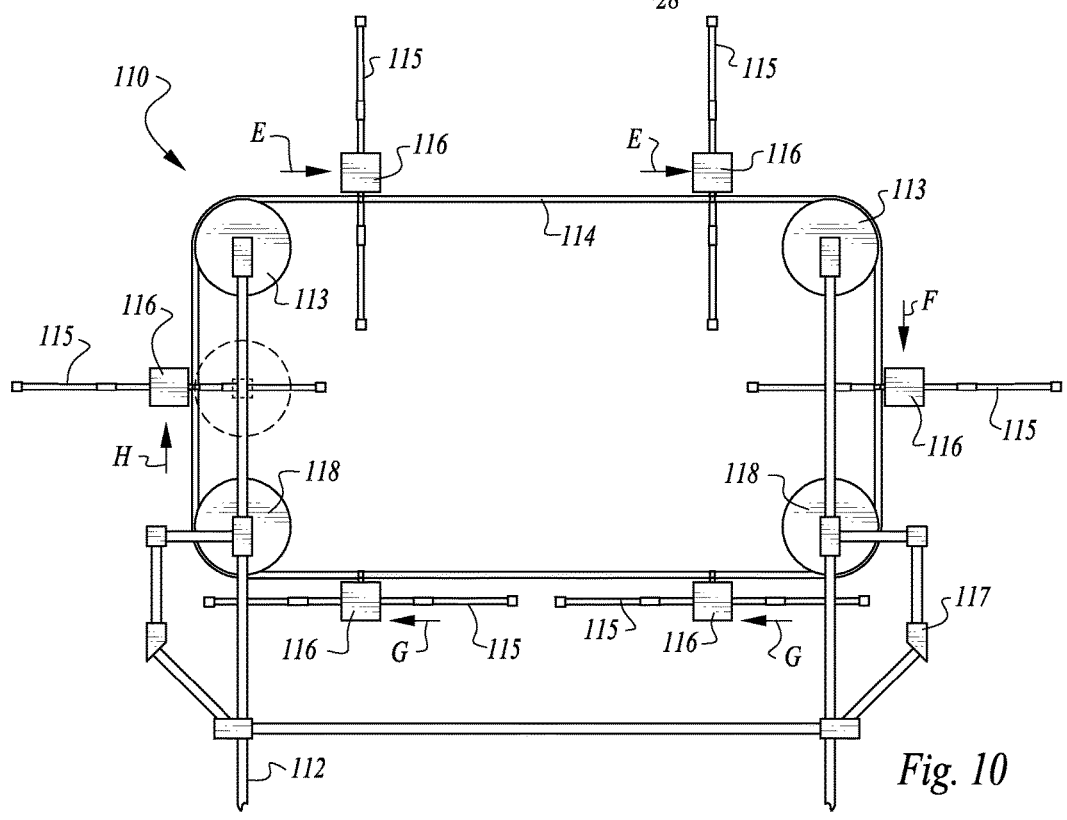
FIG. 10 is a side elevation view of an alternative wave energy conversion system with a downstream path of a cable spaced from an upstream path of the cable by additional lower pulleys, such as to accommodate sails of a larger size.

The pulleys 30 have a diameter sufficiently great that they keep the sail assemblies 50 from bumping into each other as they pass along the downstream run of the cable 40 and the upstream run of the cable 40. Because the sail assemblies 50 are oriented horizontally in the upstream run, the pulleys 30 only need to have a diameter similar to half of a height of each sail assembly 50. Further clearance can be provided for larger sail assemblies 50 if additional pulleys 30 are utilized. For instance, and with reference to the alternative system 110 of FIG. 10, four sets of pulleys are provided including two upper pulleys 113 (one upstream and one downstream) and two lower pulleys 118 (one upstream and one downstream). The cable 114 is routed about all of these pulleys 113, 118 (along a path denoted by arrows E, F, G and H). An idler pulley can also be provided (see broken lines in FIG. 10) which can be spring biased to push out on the cable 40 and act to tension the cable 40 a desired amount. In this alternate system 110, larger sail assemblies 115 can be provided and still avoid bumping into each other, and allowing for the pulleys 113, 118 to be smaller in diameter. Other details of the alternate system 110 including sail orientation controllers 116 and blocking bars 117 which are similar to those in the system 10, except that the blocking bars 117 are located adjacent the lower pulleys 118.

Each cable 40 is preferably a continuous circuit of high strength flexible cable. As an alternative, the cable 40 could be replaced with a band such as a metal band, or could conceivably be in the form of chain or other elongate flexible elements having sufficient strength to carry the sail assemblies 50 over the pulleys 30. The cable 40 includes sail support joints 42 at locations where the sail assemblies 50 are coupled to the cable 40 (see FIGS. 3 and 4). While the cable 40 is shown very tight and with the downstream run and upstream run horizontal, some degree of sag in the cable 40 between the upstream pulleys 30 and the downstream pulleys 30 could be accepted without significant degradation of the operation of the overall system 10.

With particular reference to FIGS. 1 and 5-8, particular details of the sail assemblies 50 are described. The sail assemblies 50 provide a preferred form of prime mover for the waver energy conversion system 10 of this invention. However, a variety of different structures could operate as prime movers within the system 10. For instance, any structure which is at least somewhat planar and able to present a surface against which generally horizontally moving water can abut and apply a force, could be utilized as an alternative prime mover to the sail assemblies 50. The sail assemblies 50 include a sail member 55. The term sail is utilized even though this sail member 55 is catching water W (FIG. 9) rather than catching air.

The sail assembly 50 of the exemplary embodiment includes an axle 52 which extends horizontally and has ends thereof connected to the cable 40, preferably through the sail orientation controllers 60. This axle 52 has a pair of masts 56 extending from ends thereof. These masts 56 preferably extend in both directions away from the axle 52. Booms 54 join ends of the masts 56 together with the booms 54 being generally parallel with the axle 52. The sail member 55 is attached to the booms 54 in the preferred embodiment. However, the sail member 55 could be attached to both the masts 56 and the booms 54.

The sail member 55 is also preferably attached to the axle 52 in this embodiment. Hence, the sail member 55 is allowed to billow somewhat between the axle 52 and each boom 54 with the sail member 55 prevented from billowing directly adjacent the axle 52. The sail member 55 could be formed from a variety of different materials. In one embodiment a high strength limited flexibility canvas material is utilized as the sail member 55. In one embodiment the sail member 55 is a rigid element, but the sail member 55 is most preferably at least somewhat flexible and is allowed to sag somewhat as it catches the water and is carried along the downstream run of the cable 40.

With particular reference to FIGS. 3 and 4, details of an alternative sail assembly 150 are described. With the alternate sail assembly 150 the axle 52 of the sail assembly 50 (FIGS. 1 and 5-8) is replaced with catch bars 160 which extend horizontally parallel to each other but with a gap 170 therebetween. The catch bars 160 surround this gap 170 and allow a sail member 155 to extend between the booms 54 (FIG. 4) and without requiring attachment to any central structures. The catch bars 160 act as a form of restraint to keep the sail member 155 from deflecting too far under forces such as forces of the waves acting upon the sail member 155. The catch bars 160 are sufficiently rigid and high strength that they can provide the structural function of the axle 52 so that the axle 52, can be replaced with the catch bars 160. The alternative sail member 155 is shown only attached to the booms 54 but could also be attached to the masts 56.

The masts 56 of the sail assembly 50 (FIGS. 1 and 5-8) and of the alternate sail assembly 150 (FIGS. 3 and 4) include bumpers 58 thereon. These bumpers 58 are strategically positioned to protect the portion of the sail assembly 50 which comes into contact with the blocking bar 70. The bumper 58 can be formed of a resilient material or high strength material (or both) to prevent damage where impact with the blocking bar 70 occurs.

With particular reference to FIGS. 5-8, details of the sale orientation controller 60 are described, according to this preferred embodiment. The sail orientation controller 60 attaches the sail assembly 50 to the cable 40 and also allows rotation between the sail assembly 50 and the cable 40 in a controlled fashion. The controller 60 thus includes a cable interface and axle interface on different portions of the controller 60. The controller 60 is depicted merely as a box but could have a variety of different configurations.

In the preferred embodiment, the sail orientation controller 60 acts as a form of "turnstile" which relatively easily allows 90° of rotation between the axle interface and the cable interface and then provides a high degree of resistance to further rotation. The controller 60 also preferably includes a form of free wheel which allows the sail assembly 50 to rotate in one direction but resists rotation of the sail assembly 50 in a second direction. In the embodiment shown, counter clockwise rotation, along arrow D of FIG. 7, is the only rotation allowed. The controller 60 thus keeps the sail assembly 50 either stationary relative to the cables 40 or allows rotation of the sail assembly 50 only in one direction and only approximately 90°.

As depicted in FIGS. 5-8, as the sail assembly 50 is reaching the end of the downstream run of the cable 40 (along arrow A of FIG. 5), the sail assembly 50 begins to rotate about the downstream pulleys 30. This rotation causes an angle of the sail assembly 50 to change as the sail assembly 50 rotates about the downstream pulleys 30 (along arrow C of FIGS. 5 and 6). As the sail assembly 50 continues to rotate about the downstream pulleys 30, the sail assemblies 50 eventually bump into the blocking bar 70 (FIGS. 6 and 7). The blocking bar 70 causes the sail assembly 50 to stop rotating merely along with the cable 40 over the pulleys 30, but rotates in a counterclockwise direction (along arrow D of FIG. 7) as the cable 40 continues to pass around the downstream pulleys 30. By the time the sail assembly 50 is traveling along the upstream run of the cable 40 (along arrow B of FIG. 8) the sail assembly 50 is oriented substantially horizontally.

A careful study of FIGS. 5-8 shows that a lower end of the sail assemblies 50 abuts the shaft 32 and prevents required rotation (along arrow D of FIG. 7). To allow the system to operate, this interference can be overcome in many ways. The pulleys 30 can have a radius greater than the height of the sail assembly 50 from the axle 52 to the lower boom 54 (by shrinking the sail assembly 50 or enlarging the pulleys 30). The shaft 32 could be left out and the pulleys 30 only rotate upon a rotating mount to the support structure 20. The shaft 32 could act as a blocking bar instead of the separate blocking bar 70. The shaft 32 could be lowered below center points of the pulleys 30 and the wheels 30 coupled to the shaft 32 through gears and intermediate shafts or other couplings to join the pulleys 30 together. The sail assemblies 50 can be configured to only extend up from the axle 52, not down.

In a similar fashion, the sail assemblies 50 are rotated another 90° when the sail assemblies 50 pass around the upstream pulleys 30 by action of an upstream blocking bar 72. While the interaction with the upstream blocking bar 72 could be in a variety of different ways, most preferably the sail assembly 50 is slightly above the upstream blocking bar 72. As the sail assembly 50 begins to rotate about the upstream pulley 30, the blocking bar 70 is impacted by a trailing edge of the sail assembly 50 as it is beginning to rotate downward while the sail assembly 50 rotates around the upstream pulleys 30. The upstream blocking bar 72 keeps the sail assembly 50 from rotating, but rather keeps the sail assembly 50 generally horizontal until the sail assembly 50 is traveling substantially vertically about the upstream pulleys 30. Note that flowing water forces acting on the sail assemblies 50 also tend to keep the assemblies 50 horizontal, and the sail orientation controller 60 can act to encourage the sail assemblies 50 to stay horizontal.

Then, as the sail assembly 50 rotates around an upper portion of the upstream pulleys 30, the sail assembly 50 rotates another 90° from a horizontal orientation to a vertical orientation and is deployed for catching the water W (FIG. 9) and driving the generator 38. The blocking bars 70, 72 are illustrated fixed to the support structure 20 in a general location. It is understood that the blocking bars 70, 72 would be positioned precisely where required for optimal performance. For instance, the upstream blocking bar 72 would likely be located very close to the upstream pulleys 30.

As an alternative to the blocking bars 70, the sail orientation controller 60 could be configured so that it not only holds the sail assembly 50 in the proper orientation, but also applies a force to the sail assembly 50 to rotate it into a desired position. For instance, the sail orientation controller 60 could be fitted with an electric motor which would rotate the sail assembly 50 to the desired orientation depending on the location of the sail assembly 50. Such a system might also work along with the blocking bars 70, 72.

The sail orientation controller 60 is shown offsetting the axle 52 of the sail assembly 50 above the upstream run of the cable 40 and below the downstream run of the cable 40 somewhat. The lower edge of the controller 60 can include a saddle that resides against the cable 40 when it is straight (such as along the downstream run) to support the sail assembly 50 against wave or water flow induced high torque loads. As the cable 40 bends around the pulleys 30 the saddle would naturally move off of the cable 40. The controller 60 could alternatively be inline with the runs of the cable 40 and inboard of the cable 40 provided that it is given clearance so that it does not impact the rims 36 of the pulleys 30.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A flowing water energy conversion system, comprising in combination:
   a support structure anchored relative to a flowing body of water;
   a pair of upstream pulleys rotatably supported relative to said support structure upon a common upstream shaft;
   a pair of downstream pulleys rotatably supported relative to said support structure upon a common downstream shaft;
   a pair of cables, each cable routed along a circuit passing around one of said upstream pulleys and one of said downstream pulleys;
   a plurality of prime movers, each prime mover coupled to and extending between each of said cables and with a surface against which the flowing water acts to move the prime movers downstream along with said cables coupled thereto;
   a power output coupled to at least one of said cables;
   wherein said surfaces of said prime movers are oriented closer to perpendicular to water flow on a downstream leg of said cable circuit than on an upstream leg of said cable circuit;
   wherein said prime movers include a sail member connected to a frame which is coupled to each of said pair of cables; and
   wherein said frame includes a pair of catch bars of substantially rigid construction extending between said pair of cables and spaced apart by a gap therebetween, said frame also including a pair of masts, each said mast having opposite extremities and with a pair of booms joining said extremities of said pair of masts to each other, and with said sail member connected to said booms and routed through said gap between said catch bars.

2. The system of claim 1 wherein said power output includes an electric generator.

3. The system of claim 2 wherein said electric generator is coupled to at least one of said pulleys.

4. The system of claim 1 wherein said prime movers each include an axle extending substantially perpendicularly between said pair of cables, with a pair of masts extending radially away from said axle and with a pair of booms joining ends of said masts, and wherein said sail member is connected to said frame through said booms.

5. The system of claim 1 wherein a blocking bar is coupled to said structure near a lower downstream side of said pair of downstream pulleys, said blocking bar positioned to be impacted by at least a portion of said prime movers as said prime movers pass around said downstream pulleys; and
   a prime mover orientation controller interposed between each said prime mover and said cables to which said prime movers are attached, said prime mover orientation controller allowing rotation of said prime mover relative to said cables.

6. A flowing water energy conversion system, comprising in combination:
   a support structure anchored relative to a flowing body of water;
   a pair of upstream pulleys rotatably supported relative to said support structure upon a common upstream shaft;
   a pair of downstream pulleys rotatably supported relative to said support structure upon a common downstream shaft;
   a pair of cables, each cable routed along a circuit passing around one of said upstream pulleys and one of said downstream pulleys;
   a plurality of prime movers, each prime mover coupled to and extending between each of said cables and with a surface against which the flowing water acts to move the prime movers downstream along with said cables coupled thereto;
   a power output coupled to at least one of said cables;
   wherein a blocking bar is coupled to said structure near a lower downstream side of said pair of downstream pulleys, said blocking bar positioned to be impacted by at least a portion of said prime movers as said prime movers pass around said downstream pulleys;
   a prime mover orientation controller interposed between each said prime mover and said cables to which said prime movers are attached, said prime mover orientation controller allowing rotation of said prime mover relative to said cables; and
   wherein said prime mover orientation controllers allow approximately 90° of rotation of said prime movers relative to said cables with more rotation resisted with a greater amount of resistance than an amount of resistance to a first approximately 90° of rotation.

7. The system of claim 6 wherein a second blocking bar is carried by said structure on a lower downstream side of said upstream pulleys, said second blocking bar located sufficiently close to said upstream pulleys that said prime movers impact said second blocking bar as said prime movers pass around said upstream pulleys.

8. The system of claim 7 wherein a pair of upstream lower pulleys are rotatably supported relative to said support structure upon a common shaft and a pair of downstream lower pulleys are rotatably supported relative to said support structure upon a common shaft, with said pair of cables routed along a circuit passing around said upstream pulleys, said downstream pulleys, said downstream lower pulleys and said upstream lower pulleys, and with said blocking bars located adjacent said upstream lower pulleys and said downstream lower pulleys.

9. A method for converting flowing water into power output, including the steps of:
- providing a support structure anchored relative to a flowing body of water; a pair of upstream pulleys rotatably supported relative to the support structure upon a common upstream shaft; a pair of downstream pulleys rotatably supported relative to the support structure upon a common downstream shaft; a pair of cables, each cable routed along a circuit passing around one of the upstream pulleys and one of the downstream pulleys; a plurality of prime movers, each prime mover coupled to and extending between each of the cables and with a surface against which the flowing water acts to move the prime movers downstream along with the cables coupled thereto; and a power output coupled to at least one of the cables;
- locating the support structure in a flowing body of water;
- allowing the prime movers to move with the water and move the cables coupled thereto along circuits;
- outputting power resulting from action of the cables upon at least one of the pulleys;
- orienting the surfaces of the prime movers closer to perpendicular to water flow on a downstream leg of the cable circuit than on an upstream leg of the cable circuit;
- providing a blocking bar coupled to the support structure and located at a lower downstream side of the downstream pulleys, the blocking bar sufficiently close to the downstream pulleys that the prime movers impact the blocking bar as they pass around the downstream pulleys;
- attaching the prime movers to the cables through a prime mover orientation controller which allows rotation between the prime movers and the cable;
- restricting rotation of the prime movers relative to the cables to approximately 90° of rotation for each pass of said prime mover against the blocking bar; and
- providing a blocking bar coupled to the support structure below and upstream of the upstream pulleys with the second blocking bar sufficiently close to the upstream pulleys that the prime mover impacts the second blocking bar as the prime movers pass around the upstream pulleys.

10. The method of claim 9 including the further steps of configuring each of said pair of cables to follow a circuit around at least four pulleys including an upstream upper pulley, a downstream upper pulley, a downstream lower pulley and an upstream lower pulley, and with the first blocking bar adjacent the downstream lower pulley and the second blocking bar adjacent the upstream lower pulley.

11. A flowing water energy converter, comprising in combination:
- a support structure;
- at least one upstream pulley rotatably supported relative to said support structure;
- at least one downstream pulley rotatably supported relative to said support structure at a location downstream from the upper pulley;
- at least one cable routed along a circuit passing around said upstream pulley and said downstream pulley;
- at least one prime mover coupled to said cable and with a surface against which the flowing water acts to move the prime mover downstream along with said cable coupled thereto;
- a power output coupled to at least one of said cables;
- wherein said surfaces of said prime movers are oriented closer to perpendicular to water flow on a downstream leg of said cable circuit than on an upstream leg of said cable circuit;
- wherein a blocking bar is coupled to said structure near a lower downstream side of said downstream pulley, said blocking bar positioned to be impacted by at least a portion of said prime movers as said prime mover passes around said downstream pulley;
- a prime mover orientation controller interposed between said prime mover and said cable to which said prime mover is attached, said prime mover orientation controller allowing rotation of said prime mover relative to said cable; and
- wherein said prime mover orientation controller allow approximately 90° of rotation of said prime mover relative to said cable with more rotation resisted with a greater amount of resistance than an amount of resistance to a first approximately 90° of rotation.

12. The converter of claim 11 wherein an upstream lower pulley is rotatably supported relative to said support structure and a downstream lower pulley is rotatably supported relative to said support structure, with said cable routed along a circuit passing around said upstream pulley, said downstream pulley, said downstream lower pulley and said upstream lower pulley, and with said blocking bar located adjacent said downstream lower pulley.

* * * * *